No. 825,234. PATENTED JULY 3, 1906.
J. M. MOREHEAD.
PROCESS OF PRODUCING CALCIUM CARBID.
APPLICATION FILED MAR. 24, 1905.
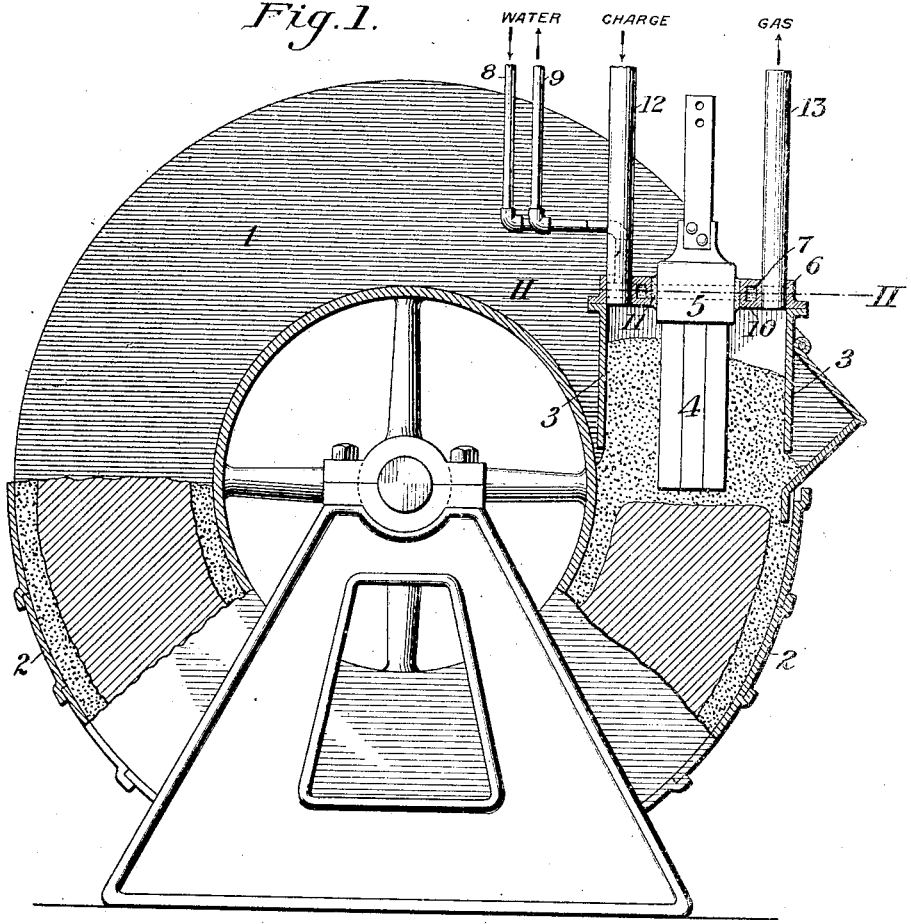
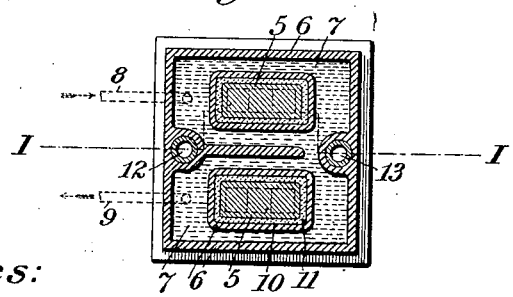
Witnesses:
R. A. Balderson
J. B. Hill
Inventor
John M. Morehead,
by Byrnes & Townsend
Att'ys.

UNITED STATES PATENT OFFICE.

JOHN M. MOREHEAD, OF CHICAGO, ILLINOIS.

PROCESS OF PRODUCING CALCIUM CARBID.

No. 825,234.　　　　Specification of Letters Patent.　　　Patented July 3, 1906.

Application filed March 24, 1905. Serial No. 251,852.

*To all whom it may concern:*

Be it known that I, JOHN M. MOREHEAD, a citizen of the United States, residing at Chicago, in the county of Cook and State of Illinois, have invented certain new and useful Improvements in Processes of Producing Calcium Carbid, of which the following is a specification.

This process is an improvement on the one described in my United States Patent No. 664,334, granted December 18, 1900.

In the patented process a zone of reduction is maintained beneath a hood which depends into the furnace-chamber and the charge is fed around and beneath the hood, so that there is a comparatively large outer mass of it to exclude air from the zone of reduction and a comparatively small mass of it within the hood, thereby directing the waste gases into the hood, whence they are delivered. I have now found that the charge may advantageously be fed directly into the hood and that the waste gases will still collect in the hood, although they are obliged to pass through a considerable body of the charge on their way to the gas-outlet. This somewhat-unexpected movement of the gases upward through the charge within the hood instead of out beneath the skirt of the hood is believed to be due to the fact that the gases rising from the zone of reaction at the lower ends of the electrodes tend to work upward through the charge along the electrodes and that they will thus pass along the electrodes through a path of greater length than through the charge itself.

The present process enables carbid to be produced with great regularity and without filling the surrounding atmosphere with dust from the finely-divided charge.

The invention will be readily understood by reference to the accompanying drawings, in which—

Figure 1 is a vertical central section of the furnace with parts in elevation, the section through the hood being taken on the line I I of Fig. 2; and Fig. 2 is a horizontal section through the top of the hood, taken on the line II II of Fig. 1.

The furnace is of the well-known Horry type, the working chamber of which consists of a wheel 1 with removable cover-plates 2. An iron hood 3 depends into the open end of the working chamber. The depending electrodes 4 are carried in vertically-adjustable holders 5. The top of the hood is closed by a plate 6 of cast-iron, within which is a cooling-chamber 7, having a water-inlet pipe 8 and an outlet-pipe 9. Parallel openings 10 to receive the electrode-holders 5 extend vertically through this cover-plate. These openings are preferably somewhat larger than the electrode-holders, and a refractory luting 11 is filled into the intervening space when the electrodes have been adjusted to the proper height. A pipe 12 for introducing the charge leads through the top of the hood behind the electrodes, and another pipe 13 for withdrawing the waste gases leads from the hood in front of the electrodes.

In operation the electrodes are adjusted to the proper height and the charge is fed in through pipe 12 until it fills a considerable portion of the hood, and thus seals its lower end. The depth of the seal may be increased, if necessary, by pulling some of the charge outward beneath the skirt of the hood. Water is continuously circulated through the cover during the operation of the furnace and the waste carbon monoxid quietly escapes through the pipe 13.

The specific electric furnace which has been shown and described is claimed in my United States Patent No. 782,917, granted February 21, 1905.

I claim—

1. The process of producing calcium carbid, which consists in establishing a region of reduction under a gas-tight hood, feeding the charge into and downward within the hood into the region of reduction, sealing the hood by a layer of the charge material extending below the lower end of the hood, and withdrawing the waste gases from the hood, as set forth.

2. The process of producing calcium carbid, which consists in establishing a region of reduction under a gas-tight hood depending into the furnace-chamber, feeding the charge into and downward within the hood into the region of reduction, sealing the lower end of the hood and the upper end of the furnace-chamber by the charge material, and withdrawing the waste gases from the hood, as set forth.

In testimony whereof I affix my signature in presence of two witnesses.

JOHN M. MOREHEAD.

Witnesses:
　E. F. PRICE,
　E. G. JOHNSTONE.